(12) United States Patent
Rolls et al.

(10) Patent No.: US 9,946,736 B2
(45) Date of Patent: Apr. 17, 2018

(54) CONSTRUCTING A DATABASE OF VERIFIED INDIVIDUALS

(75) Inventors: Dan Rolls, Rehovot (IL); Ilan Cohn, Herzliya (IL)

(73) Assignee: Ilan Cohn, Herzlia (IL)

( * ) Notice: Subject to any disclaimer, the term of this patent is extended or adjusted under 35 U.S.C. 154(b) by 893 days.

(21) Appl. No.: 11/792,391

(22) PCT Filed: Jan. 21, 2007

(86) PCT No.: PCT/IL2007/000074
§ 371 (c)(1),
(2), (4) Date: Jun. 6, 2007

(87) PCT Pub. No.: WO2007/083313
PCT Pub. Date: Jul. 26, 2007

(65) Prior Publication Data
US 2009/0248653 A1 Oct. 1, 2009

Related U.S. Application Data

(60) Provisional application No. 60/759,973, filed on Jan. 19, 2006, provisional application No. 60/844,359, filed on Sep. 14, 2006.

(51) Int. Cl.
*G06F 7/00* (2006.01)
*G06F 17/30* (2006.01)
*G06Q 30/02* (2012.01)
*G06F 17/00* (2006.01)

(52) U.S. Cl.
CPC .. *G06F 17/30286* (2013.01); *G06F 17/30699* (2013.01); *G06F 17/30702* (2013.01); *G06F 17/30766* (2013.01); *G06Q 30/02* (2013.01)

(58) Field of Classification Search
CPC ......... G06F 17/30699; G06F 17/30702; G06F 17/30766; G06F 17/30286
USPC .......... 707/999.101–999.105, 999.01, 999.1, 707/803, 999.001–999.005, 758
See application file for complete search history.

(56) References Cited

U.S. PATENT DOCUMENTS 5,220,501 A * 6/1993 Lawlor et al. .................. 705/40
5,659,731 A * 8/1997 Gustafson ....................... 705/38
5,857,028 A * 1/1999 Frieling ......................... 382/116

(Continued)

FOREIGN PATENT DOCUMENTS

WO 2005/107405 11/2005

OTHER PUBLICATIONS

Yu et al., "A Social Mechanism of Reputation Management in Electronic Communities." *Cooperative Information Agents; International Workshop, Proceedings.* pp. 154-165, 2000. (XP-002275773).

*Primary Examiner* — Kannan Shanmugasundaram
(74) *Attorney, Agent, or Firm* — Browdy and Neimark, P.L.L.C.

(57) ABSTRACT

A method including entering individual-associated data bits (IDBs) into a computerized system, the set of data of each of the IDBs including at least one personal identifier of an individual and relationship data including data on one or more related individuals and the nature of the relationship, processing the entered IDBs on a processor, generating an individual-identifier data set (IDS) for each identified individual or one of the related individuals having data in the processed IDBs, and storing IDSs of identified individuals in a database.

20 Claims, 8 Drawing Sheets

(56) References Cited

U.S. PATENT DOCUMENTS

| | | |
|---|---|---|
| 6,175,831 B1* | 1/2001 | Weinreich et al. |
| 6,373,488 B1 | 4/2002 | Gasper et al. |
| 6,416,325 B2 | 7/2002 | Gross |
| 6,513,059 B1 | 1/2003 | Gupta et al. |
| 6,553,350 B2 | 4/2003 | Carter |
| 6,570,567 B1 | 5/2003 | Eaton |
| 6,704,787 B1* | 3/2004 | Umbreit ............... 709/229 |
| 6,742,001 B2 | 5/2004 | Ripley |
| 6,886,015 B2 | 4/2005 | Notargiacomo et al. |
| 7,047,204 B1* | 5/2006 | Wood et al. ............... 705/4 |
| 7,860,318 B2* | 12/2010 | Mandelbaum et al. ...... 382/218 |
| 7,929,951 B2* | 4/2011 | Stevens ............... 455/414.1 |
| 2001/0037451 A1* | 11/2001 | Bhagavatula et al. ........ 713/155 |
| 2001/0054153 A1* | 12/2001 | Wheeler et al. ............. 713/185 |
| 2002/0023230 A1 | 2/2002 | Bolnick et al. |
| 2002/0032687 A1* | 3/2002 | Huff ............... 707/104.1 |
| 2002/0049806 A1* | 4/2002 | Gatz et al. ............... 709/203 |
| 2002/0095357 A1* | 7/2002 | Hunter et al. ............... 705/27 |
| 2003/0083938 A1* | 5/2003 | Smith et al. ............... 705/14 |
| 2003/0115459 A1* | 6/2003 | Monk ............... 713/168 |
| 2003/0126092 A1* | 7/2003 | Chihara ............... 705/67 |
| 2003/0182621 A1* | 9/2003 | Mazza et al. ............... 715/504 |
| 2003/0220980 A1* | 11/2003 | Crane ............... 709/207 |
| 2004/0010472 A1* | 1/2004 | Hilby et al. ............... 705/67 |
| 2004/0122855 A1 | 6/2004 | Ruvolo et al. |
| 2004/0128322 A1* | 7/2004 | Nagy ............... 707/104.1 |
| 2004/0148275 A1 | 7/2004 | Achlioptas |
| 2005/0022239 A1* | 1/2005 | Meuleman ............... 725/46 |
| 2005/0147947 A1* | 7/2005 | Cookson et al. ............. 434/154 |
| 2005/0149522 A1* | 7/2005 | Cookson et al. ............... 707/7 |
| 2005/0159970 A1 | 7/2005 | Buyukkokten et al. |
| 2005/0171832 A1 | 8/2005 | Hull et al. |
| 2005/0177385 A1 | 8/2005 | Hull et al. |
| 2006/0047725 A1* | 3/2006 | Bramson ............... 707/204 |
| 2006/0136419 A1* | 6/2006 | Brydon et al. ............... 707/9 |
| 2006/0173792 A1* | 8/2006 | Glass ............... 705/75 |
| 2006/0212931 A1* | 9/2006 | Shull ............... G06F 21/55 726/10 |
| 2007/0005601 A1* | 1/2007 | Gaucas ............... 707/9 |
| 2007/0033203 A1* | 2/2007 | Nemazi et al. ............... 707/100 |
| 2007/0143625 A1* | 6/2007 | Jung et al. ............... 713/182 |

* cited by examiner

| PARAMETER | DATA ON A IN IDBs-A | | DATA ON A IN IDBs-B | | ACCEPT | SCORE (1-10) |
|---|---|---|---|---|---|---|
| AGE | 37 | $A_1$ | 38 | | NO | 9 |
| GENDER | FEMALE | $A_2$ | FEMALE | $B_2$ | YES | 10 |
| PLACE OF BIRTH | BALTIMORE | $A_3$ | NEW YORK | | NO | 4 |
| COLOR OF EYES | BLUE | $A_4$ | BLUE | $B_4$ | YES | 10 |
| DATE OF BIRTH | JANUARY, 11, 1969 | $A_5$ | JANUARY, 11, 1969 | $B_5$ | YES | 10 |
| FATHER's NAME | PETER | $A_6$ | PETER | $B_6$ | YES | 8 |
| MOTHER's NAME | MARY | $A_7$ | MARIE | | NO | 5 |
| BROTHER's NAME | FRANK | $A_8$ | | $B_6$ | NO | 5 |
| RESIDENCE | NEW YORK | $A_9$ | | | NO | 5 |

FIG. 4

CONSTRUCTING A DATABASE OF VERIFIED INDIVIDUALS

FIELD OF THE INVENTION

The present invention concerns the construction of a database of individuals and use thereof. In particular, the present invention concerns such database that is constructed and is used in a computer network.

BACKGROUND OF THE INVENTION

The Internet is very useful as a medium of communication and provision and retrieval of information. The Internet became also a medium in which individuals form or associate themselves with virtual communities consisting of individuals with common interests, backgrounds, etc. In order to belong to such a virtual community an individual 'surfing' the Internet typically needs to locate the proper website and register. It would have been useful to have an Internet-based means that will be able to associate an individual with one or more communities ("community" including individuals with family relations, individuals having a common interest, individuals having a similar origin or background, etc.), based on a self entered profile.

The Internet also proved to be a useful tool for individuals to locate family members, lost friends, etc. This requires posting notes on appropriate virtual bulletin boards, using appropriate search engines, etc. This, however, is a relatively chance process and may not always bring the desired results. It would have been useful to streamline this process.

Some background information may be found in the following publications:

U.S. Pat. No. 6,373,488 to Gasper et al., discloses a three-dimensional tree-structured data display;

U.S. Pat. No. 6,416,325 to Gross discloses a genealogical analysis tool;

U.S. Pat. No. 6,513,059 to Gupta et al., discloses an adaptive collaborative intelligent network system;

U.S. Pat. No. 6,553,350 to Carter discloses a method and apparatus for pricing products in multi-level product and organizational groups;

U.S. Pat. No. 6,570,567 to Eaton, discloses a system and method for using a graphical interface for the presentation of genealogical information;

U.S. Pat. No. 6,742,001 to Ripley discloses a system and method for sharing data between hierarchical databases; and U.S. Pat. No. 6,886,015 to Notargiacomo et al., discloses a method and system for building a family tree.

GENERAL DESCRIPTION OF THE INVENTION

A serious issue with Internet use is the fact that it is difficult to verify the identity of communicating individuals. This relative difficulty in verifying an identity of surfing individuals is an issue in carrying out transactions, such as the purchase of goods or services, over the Internet. The difficulty in verifying identities of 'surfing' individuals is also a serious issue when confronting a certain individual who identifies himself to be someone other than he really is. Abuse of this nature is a serious issue in Internet chat rooms, in dating services and in many other cases.

The present invention provides a novel method and system for linking and networking individuals. In accordance with the invention a computerized system is provided that permits users of a computer network, particularly, but not exclusively, the Internet, to input data on themselves and related individuals and based on that, optionally with verification of data input by other individuals, a database of individuals, users and non-users, and their relationships is constructed. The method and system of the invention have a variety of different utilities as will be elucidated by the different aspects and embodiments described below.

In the present specification the words "individual" and "person" may be used interchangeably. The term "user" will be used to denote an individual who uses the system and the method described below and who enters or views data entered or database items generated in accordance with the invention.

The term "network" or "computer network", as used above and further below, denotes any communication network that permits many users to communicate with one another, exchange information and files, etc. The network is in particular the Internet, although not exclusively. The network may also be, for example, an Intranet. The term "network" should be construed in a broad sense as including different forms of communication that permit transmission of data between a plurality of data transceivers. This includes, but not limited to, computerized networks such as the Internet in which computerized devices, e.g. personal or handheld computers, can be employed for entering and/or receiving data; it may be a line telephone network, in which data may, for example, be entered through the use of the numerical keyboard, e.g. by following an audible menu; a cellular network, through which users communicate using mobile communication devices; and any combinations thereof.

By one of its aspects there is provided a method for constricting a database, comprising: permitting a plurality of users to enter individual-associated data bits (IDBs) into a computerized system, each of the IDBs comprising at least one personal identifier relating to the user and relationship data comprising data on one or more related individuals and the nature of relationship; and processing the entered IDBs to generate an individual-identifier data set (IDS), one for each identified individual, being either one of the users or one of the related individuals and construct a database comprising IDSs of identified individuals.

By another aspect the invention provides a method for constructing individual-identifying data records, comprising processing a plurality of individual-associated data bits (IDBs) entered by a plurality of users of a computerized system, each of which comprises at least one personal identifier on the user and relationship data comprising data on one or more related individuals and the nature of relationship to obtain said data record in the form of an individual-identifier data set (IDS), one for each identified individual, being either one of said users or one of said related individuals, and constructing a database comprising IDSs for identified individuals and their position in a relationship web.

The term "permitting" used above and further below denotes providing individuals with an access to perform the action specified. This may be, by one embodiment, broadcasting a user interface consisting of one or more electronic forms or pages over a computer network, in which individuals can enter data. The user interface has typically data entry fields for entry of the IDBs. The fields may include fixed fields where data may be entered in the form of text, by selecting or marking one of plurality of options, by free text entry fields, etc. Such filed may include essential fields and optional fields. By another embodiment, this may include providing users with the ability to transmit an electronic file containing the data. Such an electronic file may be transmitted over the network, or may be transmitted off-line through any other suitable carrier of electronic information such as CD-ROM, a magnetic disk, a flash card, etc. As is clear, the invention is not limited by the manner in which the data is entered.

The term "individual-associated data bits" or "IDBs" denotes a group of data pieces that relate to the individual entering the data. Each of the IDBs may be unique for a specific individual and may include a minimum set of data that permits to identify an individual at a certain degree of probability and includes some personal identifiers and relationship data. The IDBs comprise both personal identifiers and relationship data, defined below. The IDBs may also include other data pieces such as family stories, information entered by a data-entering individual for the benefit of others that view his IDB and in general any information a data-entering individual wishes to associate with data related to him/her.

The term "personal identifiers" denotes pieces of data on an individual. The personal identifier of an individual may be entered by that individual or may, at times, be entered by other users to form the IDS (defined below). Personal identifiers may include formal identifiers such as name, address, birth date, etc., and other identifiers such education, profession, interests, hobbies, health data, blood type, tissue type, genetic profile, martial status, etc. The entered data may typically include a minimum set of data that can jointly identify an individual with some degree of probability. Said minimum set of data typically include a combination of identifiers that distinguish the specific individual from others; namely the chance of mistaking such an individual for another is relatively low. Said minimum set of data should preferably be entered both with respect to the personal identifiers as well as with respect to the relationship data. Such minimum set of data typically include familial data, namely at least some data relating to the individuals family.

The term "relationship data" denotes pieces of data that relate to individuals that the data-entering individual has some form of relationship with. Particular example includes other individuals with whom the data-entering individual has some form of family ties. These may include first degree family members (parents, brothers and sisters, spouse, children) as well as further (second, third, etc.) degree family members (grandparents, cousins, in-laws, etc.). The family members included in the relationship data may be living and/or dead. In addition, the relationship data may also include data on other type of related individuals including friends, acquaintances, neighbors, business colleagues or associates, members of societies or organizations to which the individual belongs, and others. The relationship data, in addition to including some formal identifiers of the related individuals, includes also data relating to the type of relationship, whether it is past and/or present relationship, etc.

The term "individual-identifier data set" or "IDS" denotes a set of data pertaining to an identified individual. The IDBs entered by an individual are processed to generate an IDS for each identified individual. The IDS may include data based on that entered by the entering individual, optionally differently arranged; or may be refined data, namely data that was initially processed, for example: to correct inherent inconsistencies; eliminate data which is inherently inconsistent and the inconsistency cannot be resolved; data corrected on the basis of IDBs entered by other individuals (see below); ascribing a reliability score to each of the IDBs (see below); etc. In its basic form, the IDS is based on the IDBs entered by an individual user. In fact an IDS will be constructed for every identified individual for whom personal identifiers were included in entered IDBs. This includes an IDS for the data-entering individual and any other identified individual for whom personal identifiers were included among the IDBs. Initially, the IDS may be constructed on the basis of IDBs entered by a single individual user. Once more IDBs are entered by different users, data on identified individuals may also be entered an included in IDBs of other users and once processed it may be included in an IDS for that identified individual, which may be either a new IDS if that identified individual was not hitherto included in the system or may be additional data added to an already existing IDS of an identified individual. The IDS for an identified individual may thus be continuously updated upon relevant data entry by other individuals.

It is possible that the IDBs do not contain sufficient information for unequivocal one-to-one identification of each identified individual. For example, an IDB of person A may include relationship data on person B with personal identifiers that include the name of person B and the nature of relationships between person A and person B. This information may be insufficient to unequivocally identify person B. Similarly, some personal identifiers of person B may also be included in IDBs entered by another person C. Thus, initially, two separate IDSs may be formed for person B. Once the two IDSs are being recognized as belonging to the same person A, the data included in them may be consolidated into one IDS.

The IDSs are typically constructed from IDBs entered by two or more different individuals. Thus, in accordance with an embodiment of the invention, at least one IDS, but preferably a plurality of IDSs are each constructed from IDBs entered by two or more individuals. As will also be noted further below, IDSs may be updated by newly entered relevant IDBs (namely IDBs including data relating to the identified individual associated with the IDS to be updated), typically on an on-going basis.

The term "individual" in a phrase such as "individual associated with the IDS" or "IDS associated with an individual" or any other phrase with a similar meaning, is being used herein to denote the individual who is the subject of the IDS (the primary record in the IDS relates to that individual).

The term "identified individual" relates to each individual, datum on whom was included in one or more entered IDBs. This includes the data-entering individual and any related individual included in the user's entered IDBs.

The term "relationship web" refers to a virtual web of nodes and lines, each node being one of the identified individuals and the lines, being relationship lines (see below) connect each node to one or more other nodes in the relationship web. Each such line may also have associated identifiers that define the type of relationship between the two individuals. The term "relationship web" should not be construed only in a graphical sense. Rather, the relationship web may be represented in many different representations including that of nodes and lines or any other graphical representation manner, in a form of data tables, it may be a virtual web generated within a computer, etc.

The term "relationship line" will be used to define a direct relationship link between individuals in the relationship web (a direct relationship link being, for example, first degree family, personal friends, business colleagues, etc. Distance between individuals in a relationship web may thus be defined in terms of a number of relationship lines. For example, three relationship lines to an individual in a relationship web of friends, mean a friend of a friend of a friend. As another example, two or three connecting lines to an individual in a family tree mean, respectively, a second degree (e.g. grandparent, grandson, uncle, brother/sister-in-law, etc.) or a third degree (first cousin, great grandparent, etc.) family ties.

By another aspect there is provided a computerized system operating over a computer network, comprising: one or more system servers linked to the network accessible by clients communicating over the network; said one or more servers being configured to receive a plurality of individual-associated data bits (IDBs) entered by clients, the IDBs comprising personal identifiers and relationship data, the relationship data comprising data on one or more related individuals and the nature of relationship, to generate an individual-identifier data set (IDS), one for each identified individual, being either one of the users or one of the related individuals, and to process all the IDSs to construct a database comprising IDSs of identified individuals and their position in a relationship web.

The computerized system is preferably operative over a computer network such as the Internet and typically comprises one or more appropriately configured servers, linked to the network. Individuals can then access the system through the network.

The relationship web may, in accordance with some embodiments of the invention, be constructed and presented in the form of family tree in which each identified individual is presented as a node and the relationship web as connectors between nodes.

The term "family tree" used in this patent specification should be construed in a broad sense as relating to a data base of a few persons and at least some of their familial relationship. The family tree may be represented graphically in one of many different graphical representation means of such information; may be stored as data records within a computer (the data record including at least one identifier for each person and one or more family relationships to one or more other individuals in the family tree); or both. A family tree may also be thought of as a graph (which may be graphically represented or be a virtual representation within a computer) in which connecting lines represent the family relationships and the nodes represent the persons of the family tree (to be referred to herein at times as "nodes"). The term "family tree" should thus be expansively construed to include any model for organizing one or more data repositories in a hierarchical arrangement comprising at least parent and children nodes. It should be understood that a tree may be of different complexity, e.g. be as simple as one parent and one child, as complex as the theoretical "single family tree" that links all data in the repositories, etc.; two or more trees may overlap, or one tree may completely include one or more other trees.

The relationship web in accordance with some embodiments of the invention may include family trees that are merged together to yield merged and enlarged family trees.

The entered IDBs, that will subsequently be included in the IDS associated with the data-entering individual, may also include personal data that, once included in the database, may benefit an individual (the data-entering individual, or another) under defined circumstances. Such data may, for example, be blood type, histocompatability data, genetic data, etc. In case of a surgery, blood transfusion or another emergency medical procedure, this will permit a rapid search for a suitable donor of blood, tissue, etc. By another example, by entering various personal descriptors such as personal interests, hobbies or occupation, personal history or background, etc., typically inserted in dedicated fields, the individual may be associated, in accordance with an embodiment of the invention that will be explained below, with other individuals with matching personal descriptors and made part of a virtual community (see below). Becoming a member of a virtual community may be beneficial as it may serve as a forum for exchange of ideas, for coordinating activities, for business transactions, etc. Data entered into an IDB may include information which may be broadcasted over the computer network or shared with others.

The IDS is a personal data record that typically comprises a main data record including data on a first person, which is the individual associated with the personal data record, and one or more sub-records including personal identifiers on one or more second, related persons and the nature of their relations (including, but not limited, to family ties) to the first person. The sub-records may include data other than the personal identifiers and the relationship data or may at times include links to such data included, for example, in the IDSs of the second persons. It is a characteristic feature of some embodiments of the invention that the IDS is in fact a product of consolidation of data from a plurality of IDBs that include data on the first person or data on relationship of second persons to the first person. For example, a person A who is a cousin of person B and a sibling of person C may have its name and possibly other identifiers included in IDBs entered by persons B and C. Thus, an IDS can be constructed for person A, in which any personal attributes about him, including his name, comprised in the IDBs entered by persons B and C will be included in the main record of such IDS, which will include also sub-records assigned to persons B and C identifying them as a cousin and sibling, respectively.

The processing of the IDB-originating data may comprise a verification procedure of one or more of the IDBs entered by an individual through comparison with IDBs entered by one or more other individuals. A data bit included among the IDBs entered by an individual that is verified through data bits included in the IDBs of one or more other individuals, has an a priori higher probability of being correct than a non-verified data bit. Furthermore, verification of a number of data bits included in the IDBs of one individual through data entered by another, may provide a measure of reliability of the entered data and thus serve as an indirect measure of verification of data bits that were not verified by the IDBs of one or more other individuals.

The verification process may include ascribing a reliability score to data bits included in the IDBs of an individual to the entire IDBs, to the IDS produced on the basis thereof or a portion thereof, e.g. a reliability score to the personal identifier of the individual associated with the IDS, based on the extent of data verification. The reliability score may be based on the degree of correspondence between the IDBs entered by different individuals. By one embodiment, a reliability scores is ascribed to each of the data pieces entered by an individual. By another embodiment, an overall reliability score for the IDS or at least the personal identifiers of the associated individual may be calculated, e.g. based on the reliability scores of the different IDBs. Other factors that may influence the reliability score include the extent of relationship data on related individuals included in the IDS, namely the number of relationship lines linking the identified individual to other identified individuals, and the reliability score of the related individuals identified in the IDS.

By one embodiment of the invention the reliability score or a reliability indicator based thereon is included in the database. The reliability indicator may be, for example be graded between poor to good, may be a score, e.g. from 1 to 10, etc. By an embodiment of the invention such a reliability core is made to be accessible to users who review the IDS of an identified individual to permit them to get a sense on the IDS's reliability.

By an embodiment of the invention an IDS of an identified individual will be included in the database only if it is equal or greater than a predetermined value.

The IDSs then form the basis for a database of identified individuals. An important feature of the database is that it includes also the position of the individual in a relationship web, said position being definable through the links of any individual to others.

The relationship web, or typically only portions thereof relevant for an identified individual, may be represented to the individual in one or more of a variety of different ways. By one embodiment, it may be represented in the form of nodes and connecting lines, as described above. By way of an illustrative example, each node may appear with some basic identifiers, e.g. name and address, and then each node may hyperlink to a more detailed description of the specific individual. By way of another example, the relationship web may be represented in one of a variety of graphical representation means for representing family trees. The viewing user may be permitted to 'navigate' through the relationship web, for example through moving a cursor to different nodes and possibly viewing node-related data, i.e. the IDS or part thereof, e.g. by 'clicking' on a node. As will be appreciated such a navigation mode is a non-limiting illustrative example only.

By some embodiments of the invention, the relationship web may be presented such that a node representing the viewing user is in the center with lines connecting his associated node to all his related individuals. In the case of a family relation, for example, direct lines may typically connect to first degree relations and indirect lines, namely lines that lead through a point representing another individual may connect to second and further degree relatives, e.g. a line to a grandparent or a nephew, will connect through a parent and a sibling, respectively. This manner of display as described above is not limiting but rather an illustrative example. By way of another example, while navigating through the relationship web, the individual which is the focus of review may be displayed in the center. Furthermore, graphic display of the relationship web is also only a non-limiting illustrative embodiment. For example, the relationship web for an individual may be presented in the form of a table listing the various relations under different categories, possibly with hyperlinks to the mentioned individuals.

The relationship web for an identified individual may include a variety of different types of relationships. One type of relationships are such entered as part of the IDBs and may include family; current friends, business associates, co-members of organizations or societies, employees, employers, work colleagues, etc.; past friends, business associates, co-members of organizations or societies, employees, employers, work colleagues, etc. However, there may also be other types of relationships that may be entered by the computerized system. For example, where an identified individual is identified as one with a certain scope of interest, hobby, as one having a specific background or origin, etc., the relationship web may be constructed to include other individuals with similar scope of interest, hobby, background or origin, etc., either globally, one linked to a certain geographic location and so forth.

The family of an individual, including identifiers of family members and the nature of the relationship of other family members with the individual, typically provides a clear and unequivocal identification of a specific individual. Thus, in accordance with one preferred embodiment of the invention, the method for constructing a database comprises: processing a plurality of individual-associated data bits (IDBs) entered by a plurality of users of a computerized system, each of which comprises personal identifiers and relationship data comprising data on one or more family-related individuals and the nature of relationship to obtain an individual-identifier data set (IDS), one for each identified individual, being either one of said users or one of said related individuals; and processing all the IDSs to construct a database comprising IDSs of identified individuals. The database, according to one embodiment, also provides an indication of the position of the identified individuals in a relationship web.

Different identified individuals in a family web have different family relationships. In other words, the family relationships of different individuals, even within the same family, will have only a partial overlap with one another. By virtue of such a partial overlap, once a family of one individual becomes linked to another and then to that of another and so forth, this may yield, eventually, an essentially global relationship web.

The IDS for each first individual includes data on other, second individuals with whom the first individual has some form of relationship, particularly, but not exclusively, family relationships. Thus, the IDS of each individual may be viewed as a relationship databases, in particular a family database of individuals related to said first individual. Thus, two or more IDSs that have at least one overlapping node may provide a basis for merging of relationship webs, particularly family trees, to one another. Thus, by one of its aspects the present invention provides a method that comprises: constructing at least two IDSs for corresponding at least two identified first individuals, each IDS comprising a relationship data record on said first individual and on one or more second identified individuals and the nature of their relationship to the first individual; identifying at least two IDSs having overlapping relationship data records including at least one identical identified individual in the corresponding relationship data records; and consolidating the at least two relationship data records to construct an expanded relationship data record. A specific embodiment involves the construction of an expanded family data record, comprising: constructing at least two IDSs for corresponding at least two identified first individuals, each IDS comprising a family data record on said first individual and on one or more second identified individuals and the nature of their familial relationship to the first individual; identifying at least two IDSs having overlapping family data records including at least one identical identified individual in the corresponding family data records; and consolidating the at least two family data records to construct an expanded relationship data record. Such consolidation, according to an embodiment of the invention, results in an expanded family tree.

The relationship web may also have different layers. For example one layer of family, another layer of friends, a further layer of business colleagues, etc.

The relationship web may also be displayed in a hierarchical way. For example, in the case of an individual with a common interest or hobby, as there may be large numbers of individuals with such an interest or hobby, rather then showing a link to each individual with the same interest or hobby, the relationship web may provide a link to a webpage, for example, that will link all individual in a given region or location sharing the same interest or hobby. Such a webpage may then link to individual sharing the same interest or hobby in other regions or locations; or a link to a global webpage of individuals with the shared interest or hobby, which will have links to regional web pages of such individuals and so forth, eventually down to the level of the different individuals.

While it is possible to permit an identified individual to review the entire relationship web, in a typical mode of implementation of the invention, the individual is permitted to review only a portion thereof relevant to that individual (such portion to be referred to, in some places, as "individual relationship web"). Such portion may be a system-wide predefined portion. For example, an individual relationship web of family members may include all family relationships up to a certain distance, namely up to a certain relationship lines distance. As another example, a relationship web of friends or business colleagues may also have a limit, e.g. up to two lines, i.e. a friend of a friend or a business colleague of a business colleague, respectively.

By another embodiment, in addition or in the alternative, each identified individual may be given the option of defining the level of his/her 'visibility' to other individuals, namely defining the portions of the IDS that my be reviewed by users. For example, an individual may be given the option of defining permissions to viewing the IDS or portion thereof, e.g. based on distance in terms of number of relationship lines or by another relationship parameter, based on a certain profile (such as all individuals with a certain defined scope of interest, residence in a certain geographical location, etc.), or using any other criterion.

Any identified individual may also, according to an embodiment of the invention, define the extent in which his IDS or portions thereof should be privileged. Also, under another embodiment, each identified individual may define or provide criteria on identified individual that may not be entitled to review all or portions of his IDS. The permissions and/or privilege criteria may apply to the entire IDS or portions thereof. Also, different criteria may be applied to different portions of an IDS.

As will be appreciated, the relationship web is not static but is rather dynamic and grows upon addition of identified individuals, additional relationship is lines and additions or updates to the already existing IDSs, as more users of the network enter their IDBs. On some occasions a new user who newly enters his IDBs may already be an identified individual through the IDBs entered by another individual. On other occasions such a new user may not be an identified individual but one or more of his related individuals may already be an identified individual. On other occasions both a new user and his related individuals may be new to the system. In the two former cases, the newly entered data will be incorporated in the already existing relationship web. In the latter case, the entered data will form an independent separate relationship web until such time as it will become linked through new data entered by later new users.

One exemplary use of the invention is in the automatic construction of a family tree. Unlike many web-based and other systems that permit a user to produce his family tree, in accordance with the invention the generation process is in fact automatic. Although the user enters some of the relevant data, other data relevant for the construction of a family tree for a specific individual may be entered by others.

In accordance with an embodiment of the invention, an identified individual receives an automatic notification, e.g. to a computerized or other communication device associated with the individual or to an electronic address associated with him in case of developments relating to him or his relationship web, i.e. updates in his IDS through IDBs added by others; for example, new data relating to him, new family members added to his family tree, new or updated data on existing individuals in his relationship web entered by other users, and a variety of other news relating to his relationship web. The computerized device may, for example be a computer in which case the notification may be an email; a communication device may, for example, be a mobile communication device and the notification may be in the form of an SMS message.

Another use of the method and system of the invention is in identifying relationships between individuals. The method according to this embodiment comprises: providing a computerized system operating over a computer network that permits users who can link to the network through a computerized device to enter said IDBs into a computerized system; processing the IDBs to generate said IDSs, one for each identified individual; and processing all the IDSs to construct a database including relationship data defining the type of relationships between identified individuals. According to one embodiment, a reliability score may computed as described above. An IDS or a portion thereof the reliability score of which is less than a predetermined value, may be excluded from the database.

By another embodiment, the invention is used for associating or grouping of individuals related to one another by one or more of the types of relationships between identified individuals, as explained above. The method according to this embodiment comprises: providing a server system that permits users of the network to enter said IDBs; processing the IDBs to generate said IDSs; and processing all the IDSs to construct a database including association data defining the type of associations for said individuals with other individuals.

By one embodiment, such associations give rise to virtual communities of identified individuals. The term "virtual community" denotes an association of identified individuals having one or more common identifiers. The common identifier may include anything that may be a basis for association of individuals such as common traits, common tastes or interests, common ancestry, common origin, common personal background, etc. A virtual community may include individuals sharing a common interest, for example individuals who like a certain art genre, individuals who practice a certain sport activity, individuals with a common academic interest individuals with a common origin, individuals who share a common hobby, individuals that are all of the same family or descend from the same ancestor, etc. Such association may be formed automatically, based on a variety of personal descriptors relating to the identified individuals entered in the IDBs and subsequently included in the IDSs. As can be appreciated, an identified individual may have different types of associations and may accordingly belong to more than one virtual community.

In accordance with an embodiment of the invention means may be provided for communication between individuals that are associated into a virtual community, such as virtual chat rooms, linking different virtual chat rooms, a virtual bulletin board, a Blog, etc.

In accordance with an embodiment of the invention, an association, group or virtual community of individuals may provide a useful means for promoting sales of a product or service within the common scope of interest. Such sales promotion may be through distribution of electronic promotion material, placing advertisements on relevant virtual bulletin boards, etc. The target individuals, according to some embodiments, may be a group of individuals sharing all one or more common identifiers.

The invention may also be applied to generate a virtual identification document (VID) for a user of a computer network. The IDS once generated and verified, can serve for a very reliable VID of a network user. Alternatively, based on the IDS, a VID may be constructed which may include some personal identifiers with a verification certificate, typically an electronic certificate, as to the correctness of such identifiers.

The method for generating a VID so as to permit a user of a network to identify another user of the network, comprises: providing a server system that permits users of the network to enter said IDBs; processing the IDBs to generate said IDS, one for each identified individual; for each user, verifying at least part of the IDBs entered by the user through one or more IDBs entered by one or more other users of the network to construct a user-specific verified IDS for said user. By one embodiment each user is then permitted to use its user-specific venrfied IDS as its VID. By another embodiment, a VID is constructed on the basis of said IDS. The VID may also include an electronic certification as to the reliability of the details appearing in the VID.

The VID is useful for verifying the identity of an individual 'surfing' the computer network in a variety of circumstances. For example, when engaging a dialog with an individual through an instant messaging service, through electronic mail, using virtual chat rooms, etc., there is always a doubt as to the true identity of the communicating individual. By transmitting or displaying the VID of the invention the true identity of the individual may be revealed.

Thus, in accordance with an embodiment of the invention a method of communication over a computer network comprises at least one first communicating user transmitting to at least one second communicating user said VID; wherein said VID is being generated from said IDBs, processed to generate said IDS, one for each identified individual, as described above and verifying at least part of the IDS by data entered by one or more other users of the network, and generating said VID following such verification.

A concrete knowledge on a true identity of an individual is also important in the case of transactions that are carried out through the use of the computer network, e.g. via the Internet. The method according to this embodiment comprises using said VID to verify the identity or other details of the individual carrying out the transaction.

The method and system of the invention provides a unique platform to permit sale or sales promotion of services or product to a group of individuals having a certain common denominator. An example of a common denominator is a similar hobby, similar occupation, similar history, etc.

The database generated in accordance with the invention is another of its aspects. Such a database may be a highly useful tool for demographic research. Such use constitutes an additional aspect of the invention. Thus, the database of the invention may be useful for data mining. In addition, the database may be useful for conducting of surveys or opinion polls, etc. In the latter case, the database may be used for sending questionnaires to individuals with specific, pre-defined profiles.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 4 exemplifies an embodiment of comparing data bits on an individual obtained from two different IDBs;

DETAILED DESCRIPTION OF EXEMPLARY EMBODIMENTS

Figure 1:
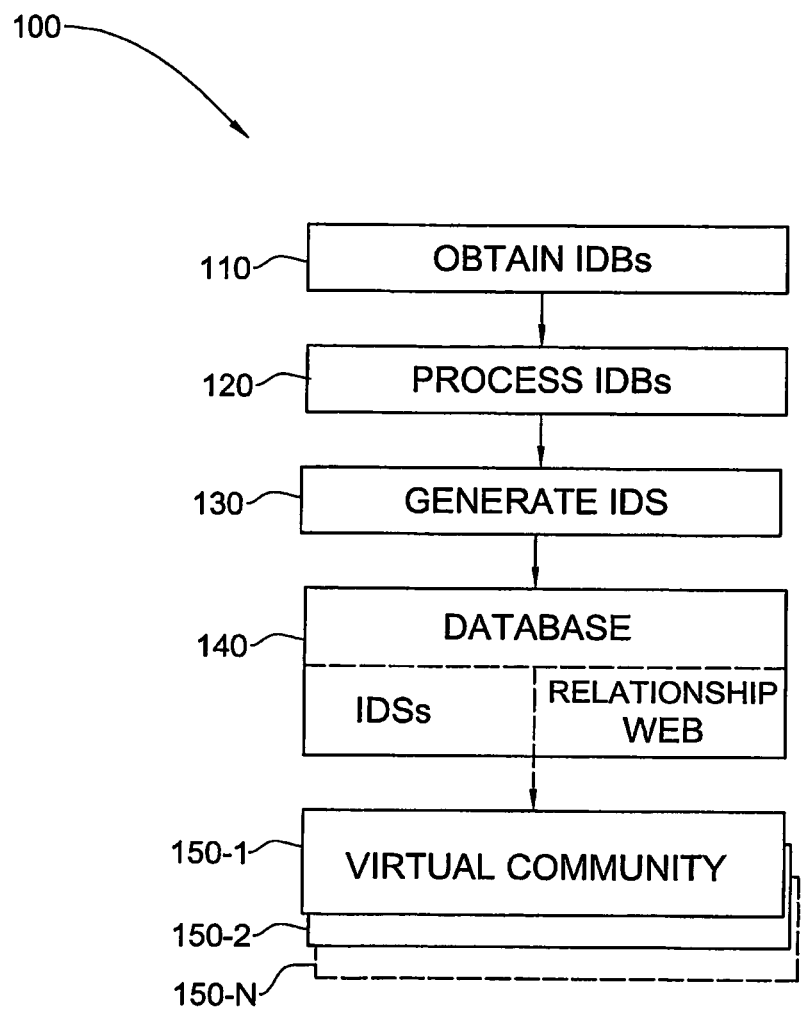
FIG. 1 is a simplified schematic flowchart illustrating an interactive method for developing virtual communities, in accordance with an embodiment of the present invention.

The present invention provides a novel method and system for creating a database and linking and networking individuals. In accordance with the invention a computerized system is provided that permits users of a computer network, particularly, but not exclusively, the Internet, to input data on themselves and related individuals and based on that, optionally with verification of data input by other individuals, a database of users and the relationship is constructed. The method and system of the invention have a variety of different utilities as will be elucidated by the different aspects and embodiments described below.

In the detailed description, numerous specific details are set forth in order to provide an understanding of the invention. However, it will be understood by those skilled in the art that these are specific embodiments and that the present invention may be practiced also in different ways that embody the characterizing features of the invention as described and claimed herein.

Unless specifically stated otherwise, as apparent from the following discussions, it is appreciated that throughout the specification discussions utilizing terms such as "processing", "computing", "calculating", "determining", "deriving", "generating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, Disk-on-Key, smart cards (e.g. SIM, chip cards, etc.), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions capable of being conveyed via a computer system bus.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Similarly, the computerized system described herein is also not related to any physical entity. The computerized system may use general components, such as servers, routers, etc., or may use specialized apparatuses design specifically for use in accordance with the teaching of the invention.

It should be understood that the methods of the present invention are exemplified by the figures herein, but not limited thereto.

Reference is now made to FIG. 1, which is a simplified schematic flowchart 100 illustrating an interactive method for developing virtual communities, in accordance with an embodiment of the present invention.

A plurality of users are permitted to enter individual-associated data bits (IDBs) into a computerized system (step 110). The obtained IDBs include each a personal identifier, which includes data relating to the user and relationship data. The relationship data includes data on the user himself and data on one or more related individuals, typically, although not exclusively, individuals related to the data-entering individual by family. The relationship data also includes data on the nature of relationship with the related individuals (e.g. child, parent, sibling, etc.). The IDBs are processed (step 120), to generate IDSs (step 130), one for each identified individual. A database of IDSs is then constructed (step 140) which includes the IDSs of all identified individuals 142 and a relationship web 144, the latter including data on the relationship links between identified individuals. The relationship web may be one merged relationship web from all individuals or may include a plurality of such webs for different groups of identified individuals.

In a subsequent optional step, virtual communities may be formed 150-1, 150-2 . . . 150-N, based on personal characteristics of the identified individuals. A virtual community is a community of individuals formed within the virtual environment of a computer network or system. The virtual community typically includes individuals which have something in common. An example of a virtual community is a virtual community of individuals related through family ties. Other examples include individuals with common ancestry, common background, common hobbies or interest and many others. The concept of virtual community is no doubt well familiar to a person versed in the art and need not be elaborated further herein. By some embodiments of the invention, the virtual communities are automatically generated (based on the IDBs). For example, an identified individual may be found to have a common identifier with a group of other identified individuals, e.g. all have the same hobby, and the computer system may group such individuals automatically and send an electronic notification to all individuals to join this virtual community and generate also a website through which they may communicate. The identified individuals may join the virtual community at their own choice.

Figure 2:
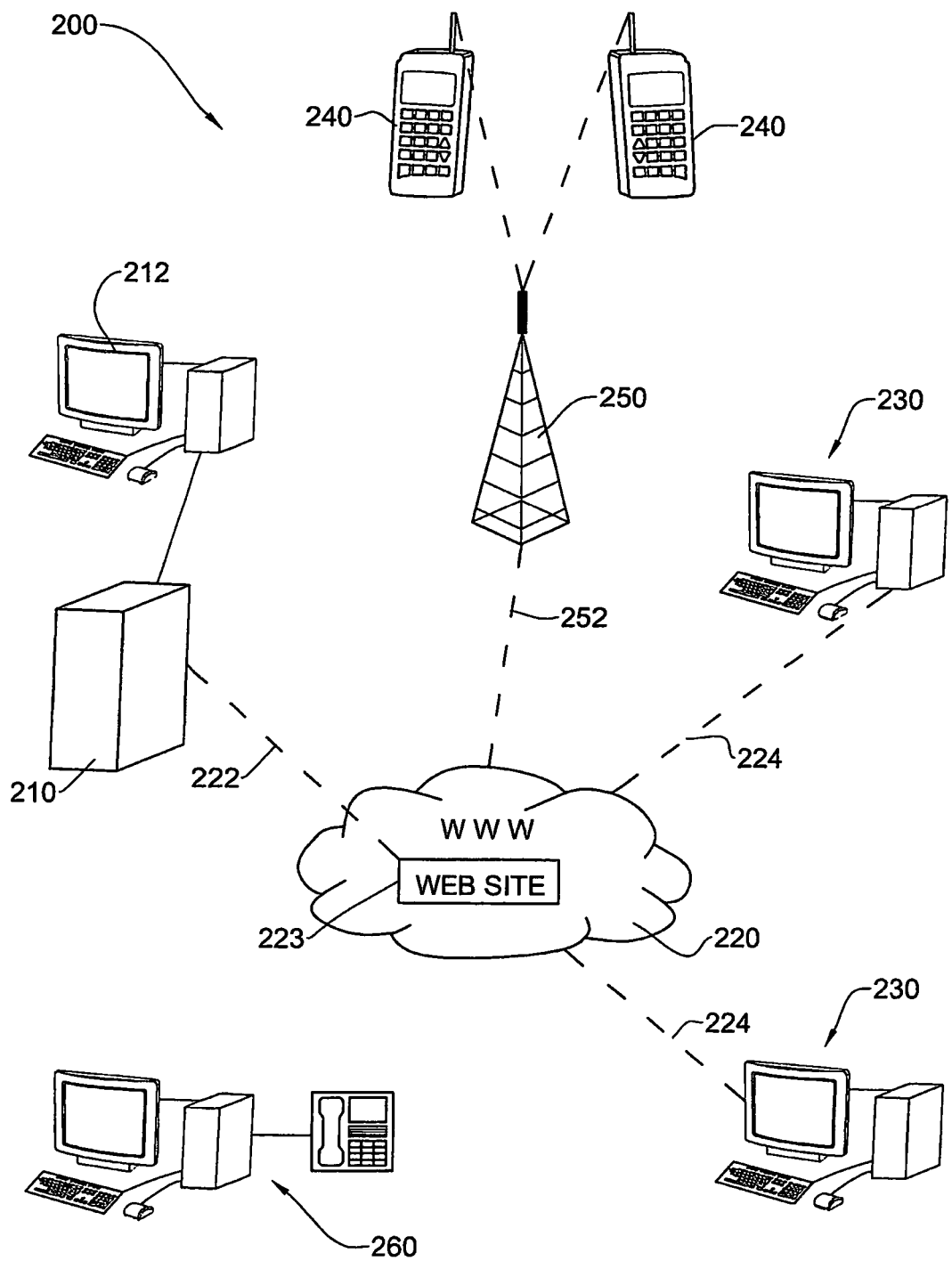
FIG. 2 is a schematic pictorial illustration of an interactive system for developing virtual communities, in accordance with an embodiment of the present invention.

Reference is now made to FIG. 2, which is a schematic pictorial illustration of a computer system 200 in accordance with an embodiment of the present invention.

It should be understood that many variations to this system are envisaged, and this embodiment should not be construed as limiting. For example, a facsimile system or a phone device (wired telephone or mobile phone) may be designed to be connectable to a computer network (e.g. the Internet). Interactive televisions may be used for inputting and receiving data from the Internet.

System 200 typically includes a server utility 210, which may include one or a plurality of servers and one or more control computer terminals 212 for programming, troubleshooting servicing and other functions. Server utility 210 is linked to the Internet 220 (constituting a computer network) through link 222, for running system website 223 and for communication with the users. Users may communicate with the server through a plurality of user computers 230, which may be mainframe computers with terminals that permit individual to access a network, personal computers, portable computers, small hand-held computers and other, that are linked to the Internet 220 through a plurality of links 224. The Internet link of each of computers 230 may be direct through a landline or a wireless line, or may be indirect, for example through an intranet that is linked through an appropriate server to the Internet. The system may also communicate through communication protocols of computers over the Internet which are known to a person versed in the art and will not be elaborated herein. Users may also communicate with the system through portable communication devices such as $3^{rd}$ generation mobile phones 240, communicating with the Internet through a corresponding communication system (cellular system) 250 connectable to the Internet through link 252. As will readily be appreciated, this is a very simplified description, although the details should be clear to the artisan. Also, it should be noted that the invention is not limited to the user-associated communication devices—computers and portable and mobile communication devices—and a variety of others such as an interactive television system may also be used. The system 200 also typically includes at least one call and/or user support center 260. The service center typically provides both on-line and off-line services to users from the at least one professional. The server system 210 is configured according to the invention to carry out the above-described method, based on data received from the users, being initiated in either pull or push mode.

Figure 3:
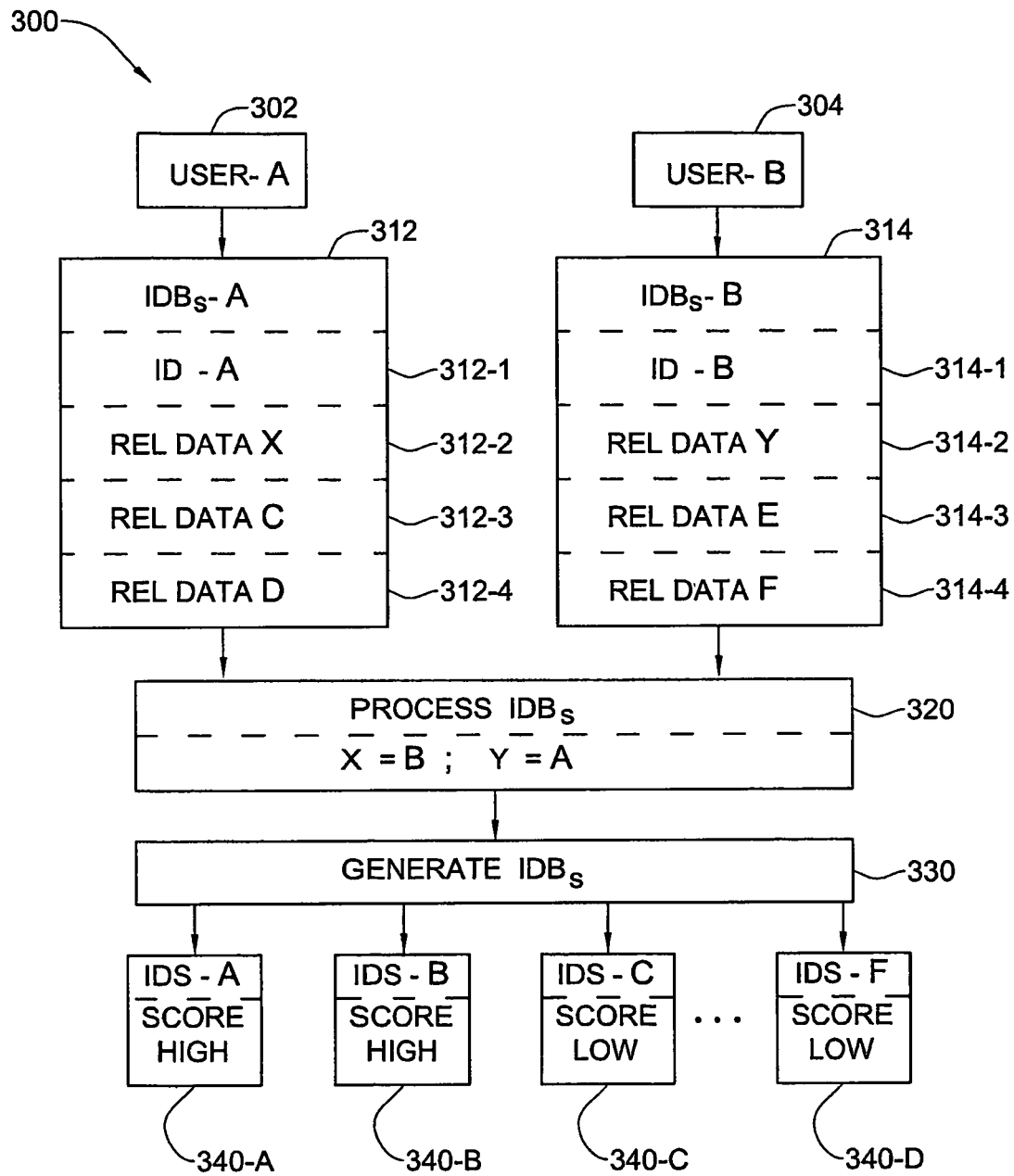
FIG. 3 is a simplified schematic flowchart illustrating a method for constructing IDSs and ascribing a reliability score in accordance with an embodiment of the present invention.

Reference is now made to FIG. 3, which is a simplified scheme of IDBs received from two users—User-A 302 and User-B 304—and processed, for example as described above with reference to FIG. 1.

User-A and User-B input respective IDBs, IDBs-A 312 and IDBs-B 314. IDBs-A 312 includes personal identifiers of User-A 312-1 and relationship data pieces 312-2, 312-3 and 312-4 on related individuals X, C and D, respectively. The IDBs-B 314 similarly includes corresponding data pieces 314-1 through 314-4 on related individuals B, Y, E and F. As will be appreciated the personal identifiers 312-1 and 314-1 consist of a plurality of data bits that may characterize each of users A and B. Similarly, relationship data 312-2, 314-2 through 312-4, 314-4 include personal identifiers of the individuals as well as relationship data identifying the nature of the relationship between each of the users A and B to the related individuals.

As will also be appreciated, the example presented herein in which there are 3 related individuals in each of the IDBs is but an example and any number of related individuals may be included in the IDBs.

Upon processing of the IDBs (step 320) the computer system identifies that related individual X and Y are individuals B and A, respectively. In the next step 330 IDSs are generated. In total, the two IDBs 312 and 314 relate to 6 identified individuals and accordingly from these two IDBs a total of 6 IDSs 340-A, 340-B, . . . , 340-F can be generated for individuals A, B, . . . , F, respectively. A reliability score for each of these IDSs may also be generated. As IDS-A 340-A and IDS-B 340-B are generated each from data included in two IDBs, the relative reliability score that may be generated may be high as compared to that of the other illustrated IDBs for which the relative reliability score will be lower.

In fact, in this very simplified illustrative embodiment, the IDS for individual A 340-A and the IDS for individual B 340-B will include a main data record for individuals A and B which will include personal identifiers verified from two different sources. In addition, the IDS of individual A 340-A. for example, will also include relationship data on individuals B, C and D. However, as individuals C and F are related to individual B they may also be included as relationship data in the IDS of individual B 340-B.

In the case of a plurality of users entering IDBs, an IDS may be generated and may receive verification from a large number of sources.

Reference is now being made to FIG. 4 which exemplifies the comparing of data bits on an individual obtained from two different IDBs. Illustrated are data bits on individual A which are included in the IDBs inputted by User-A and in IDBs inputted by User-B.

Often data bits on an individual entered from one source may include inaccuracies or may be incomplete. As is illustrated in the example of FIG. 4, 9 different parameters on individual A are included. User-A has inputted data relating to his/her age, gender, place of birth, eye colour, date of birth, father's name, mother's name, brother's name and residence ($A_1$ to $A_9$, respectively). User-B has inputted corresponding data relating to User-A, save for bits $A_8$ and $A_9$. In some embodiments, the two sets of data bits are compared to provide a binary output of "match/mismatch" ("YES"/"NO"), relating to the two pieces of data that were compared. A more complex algorithm may be applied upon comparing of pieces of data on the same individual from multiple IDBs. In some other embodiments, the output may provide a score based on the closeness of match. For example, relating to the data in FIG. 4, if a binary scoring system is used then the father's name of User-A will be accepted (as both inputs match and are "Peter") and if a score is provided, such as ten out of ten. In contrast, if the binary comparison system is used relating to the mother's name, the input will be rejected as "Mary" and "Marie" do not match, whereas, on a scoring basis, the score may be eight out of ten. Similarly, the age of user$_{(f)}$ may be rejected on a binary basis, but ascribed a score of 9 on a scoring basis. Regarding the place of birth, if a binary comparison system is used, then "Baltimore" and New York" do not match, whereas on a score system, a score of 4 out of 10, for example, may be provided. For brother name and residence, no data is provided in the IDBs of User-B and while in a binary comparison system this data may be rejected, in a scoring system this may receive a medium score such as 5. In the subsequent constructed IDS, in the case of the binary system, the data bits to be entered may include only those with a full match. Against this in a scoring system the data to be included may be such with a score above a certain number, e.g. a score greater than 5, in which case data bits $A_1, A_2, A_4, A_5, A_6$ and $A_7$ will be included. Furthermore, the IDS may be ascribed a total reliability score based on the individuals score a typically also factoring in other factors such as the number of IDBs used to construct the IDS, the number of related individuals, the reliability score of related individuals, etc.

In some embodiments, different weightings may be given to different data bits. For example, the weighting of data provided by an individual regarding himself may be twice that of a sibling relating to that individual and three times more than that received from a cousin regarding that individual. The degree of closeness of the user providing the information relating to the individual may be used to calculate the weighting. The weighting may therefore, for example, be calculated as a function of the number of verifications multiplied by the weighting assigned to each of the verifications (each of which is itself a function of the closeness of the two users in that verification).

Thus, in some embodiments the data provided by User-A regarding the mother's name, place of birth and age may be accepted, whereas these data provided by User-B may be rejected due to the lower weighting thereof.

It should be understood that many different other weighting models and comparison algorithms, including such that are known in the art, can be applied in accordance with the invention.

Figure 5:
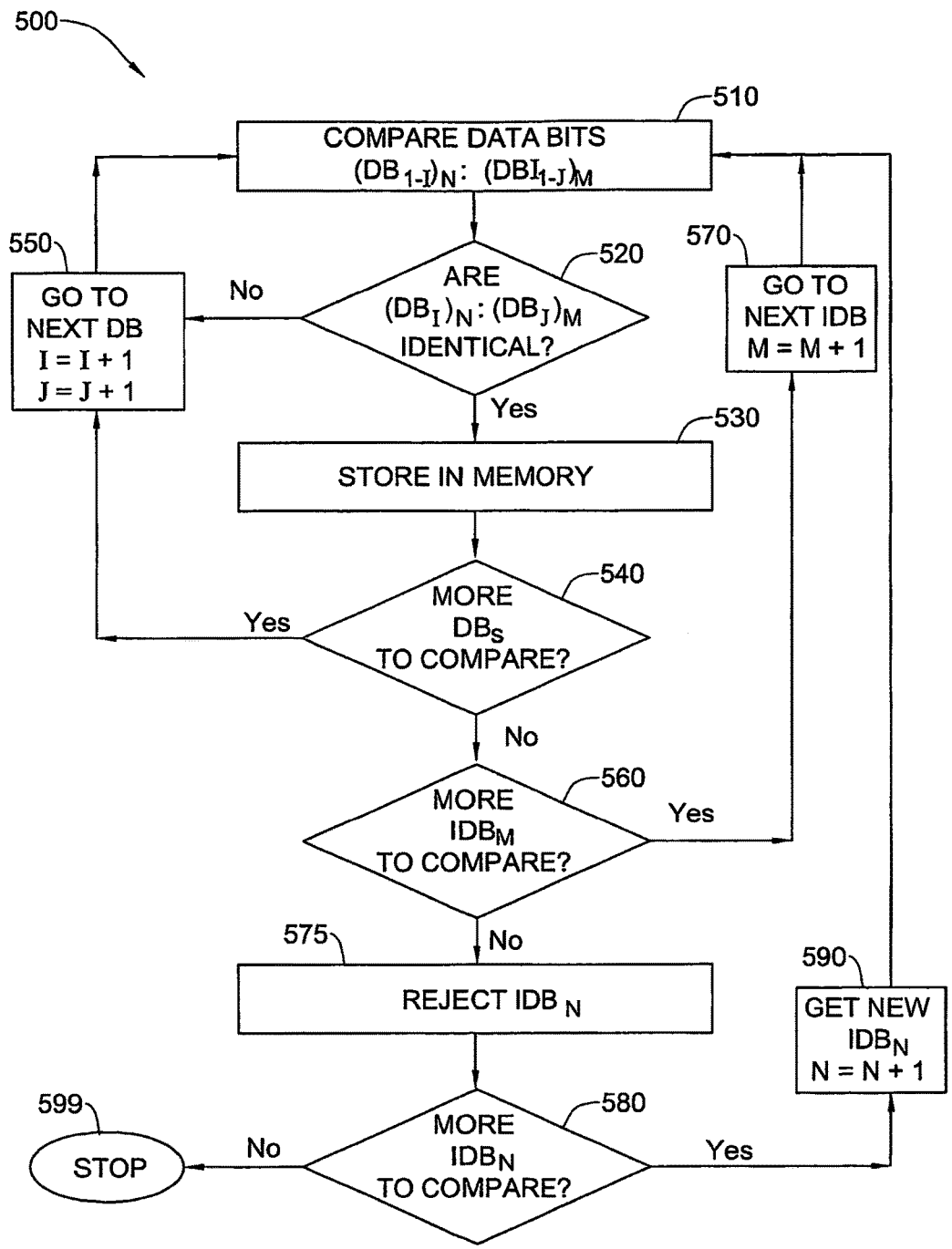
FIG. 5 is a simplified schematic flowchart illustrating an embodiment of step 320 of FIG. 3.

Reference is now made to FIG. 5, which is a simplified schematic flowchart 500 illustrating an example of implementation of the processing step 320 of the embodiment of FIG. 3.

In a binary comparison step 510, the individual data bits in the IDBs of two users, User$_N$ and User$_M$ (data bits 1 to I of the IDB$_N$ of User$_N$, $(DB_{1-I})_N$, and data bits 1 to J of the IDB$_M$ of User$_M$, $(DB_{1-J})_M$), for example User-A and User-B of FIGS. 3 and 4, are compared. For example, the age of User$_N$ is compared to that provided by User$_M$ in the comparing step 510. As is seen in FIG. 4, User-A has inputted her age to be 37, whereas User-B has indicated that the age of User-A is 38. In a checking step 520, the system checks to see if ($(DB_j)_N$ and $(DB_j)_M$) are identical. If the two data bits are identical, as in the case, for example, with respect to data bit A2 in FIG. 4, these data bits are stored 530 in the memory and then in a subsequent step 540 the system determines whether there are more data bits in the two IDBs to compare and if positive next data bits are selected 550 in the two IDBs and processes begins again. In case the comparison step 520 yields a negative result, the system proceeds directly to determining step 540.

In case the determining step 540 concludes that there are no more data bits in the two IDBs to compare, the system determines whether there are more IDB$_M$s to compare. If positive the next IDB is chosen 570, the next IDB being chosen from either a random list of IDBs or from a list of IDBs predetermined to have a high probability of matching data bits with the data bits included in IDB$_N$.

Should comparison step 560 yield a negative result, the $IDB_N$ is rejected 575 and the system proceeds to next determining step 580 to determine whether there are more $IDB_N$s that should be compared to other IDBs. If in the affirmative, a new $IDB_N$ is obtained and the system returns to step 510. If there is no additional $IDB_N$ the operation stops 599.

In some other embodiments, the IDBs are stored and assigned reliability values. The reliability values may be accumulated for each user so as to ascribe to each user a general reliability value (GRV). The GRV may be used to choose selected users having relatively high GRVs for providing information to the system and for eliminating the less reliable users with lower GRVs.

Figure 6:
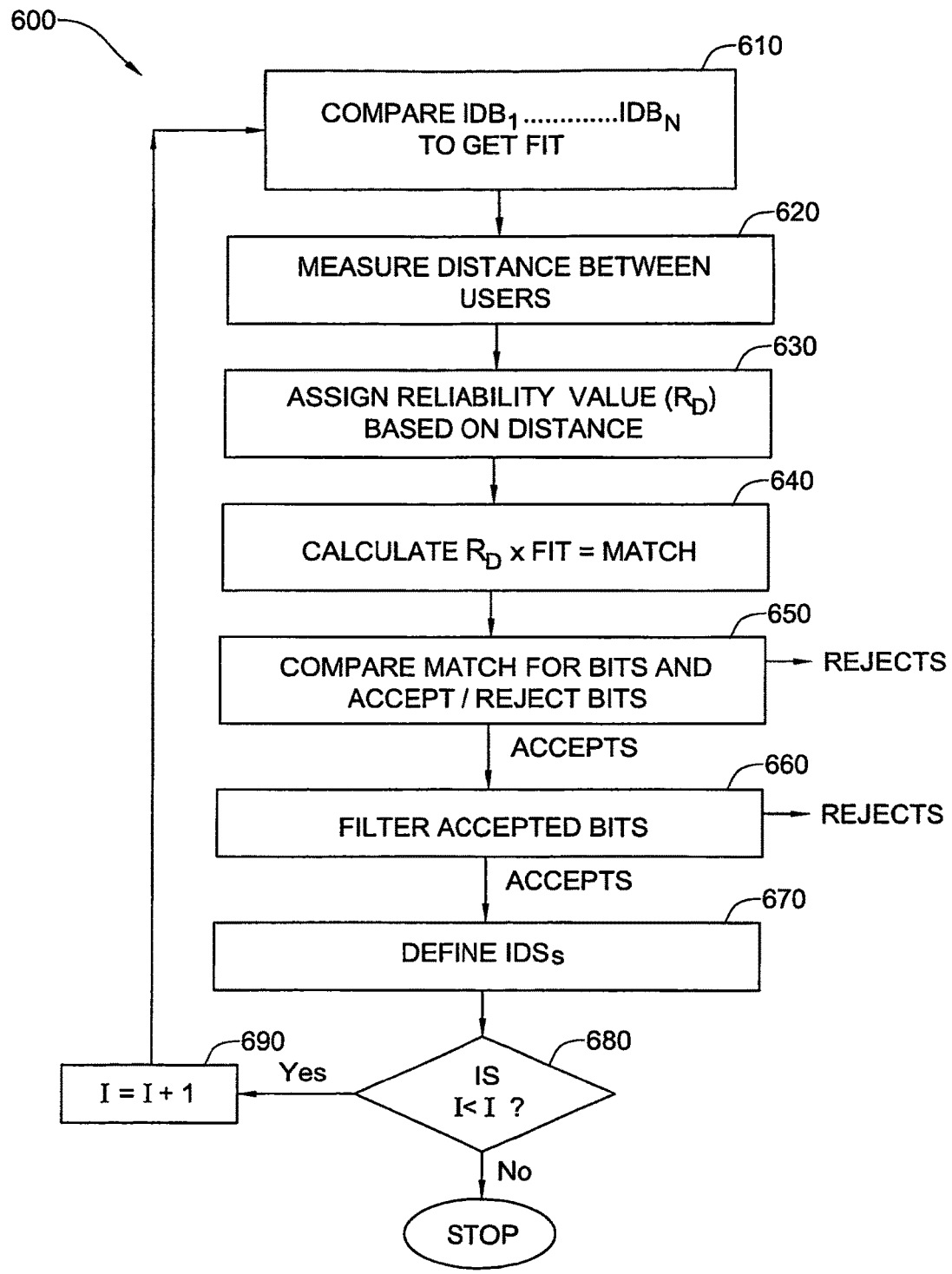
FIG. 6 is a simplified schematic flowchart illustrating an embodiment of step 120 of FIG. 1.

Reference is now made to FIG. 6, which is a simplified schematic flowchart 600 illustrating an embodiment of step 120 for obtaining individual-identifier data set (IDS) of FIG. 1.

As is described hereinabove, and particularly with reference to FIGS. 1-5, system 200 is operative to obtain IDBs for a plurality of users. The IDBs can be obtained over the internet and/or via any of the apparatus shown in FIG. 2 or any other known in the art. IDBs from different users are compared in flowchart 600. For example, the IDBs accepted in the illustrated example of FIG. 3, may be further compared taking into account the relative distances, namely the number of relationship lines, between the two or more users. In some embodiments, this is a further process in addition to the comparisons of IDBs made with reference to FIGS. 3-5.

In other embodiments, this process at least partly replaces some of the steps described in FIGS. 3-5. For example, in flowchart 600, the IDBs of multiple users designated $IDB_1$ . . . $IDB_N$ obtained respectively from users $User_1$ . . . . $User_N$ are compared in comparison step 610. These IDBs may be pieces of information provided by a user regarding himself and one or more other relevant individual. When a comparison of multiple sources of data is employed in step 610, one or more algorithms may be applied to eliminate any extraneous data processing (such as by rational design methods, known in the art).

For example, in step 610, the IDBs obtained from a plurality of users relating to various identifiers can be compared to obtain a set of relative fits of the various IDBs.

The output of step 610 may include at least one of the following;
    a) a fit of IDBs obtained relative to data in a memory or database;
    b) a fit of IDBs obtained from one or more users relative to one or more other users;
    c) a plurality of IDBs pertaining to different users;
    d) at least one indication of a relationship and/or distance between two or more users.

In a measuring step 620, the distance between two or more users is calculated or measured. Distance may be defined according to one or more set of rules. One nonelimiting example includes at least one of the following:
    a) A relationship line between two blood relatives of a first degree is standardized to one standard length away (such as a user to his child, parent, sibling or spouse); a line of two standard relationship lines may be standardized by a blood relationship of two degrees (such as a user to his grandparent or grandchild, first cousin, niece or nephew, sibling-in-law, parent-in-law) etc.; and
    b) A line between friends may be defined in relative terms of, for example: a lover, first degree; best friend, first degree (one standard distance away); social group friend, second degree (two standard distances away), work acquaintance, third degree (three standard distances away).

The distance between at least some of the set of users may be calculated using the one or more set of rules and outputted. Thereafter, the calculated distances are stored in the system's computerized memory.

In an assigning reliability step 630, the reliability of data obtained from a user concerning another user is calculated as a function of the distance between them calculated from step 620. For example, blood relatives of three relative lengths away, may be assigned a higher reliability value (to be designated herein as "$R_D$ value" or "$R_D$") than friends of the same relative length away.

In a calculating match step 640, the match is calculated as a function of the $R_D$ value. In some cases, this may be a simple multiplication of match using the corresponding fit from step 610.

In an accepting step 650, all IDBs having a match of more than a pre-determined value are accepted and others rejected. In some embodiments, only the accepted IDBs are saved to memory.

In an optional filtering step 660, one or more algorithms are applied to the accepted IDBs. The filtering step is designed to reduce the number of IDBs to a minimum and to reject "non-essential IDBs".

As already noted above, each IDB includes personal identifiers of the data-entering individual as well as data on related individuals. At the end of the process 670, an IDS, is defined for each of the identified individuals, which include the data-entering individual a well as the related individuals.

In a user checking step 680, it is checked to see if an IDS has been calculated for all of the identified individuals in all of the IDBs. If negative, a search is performed to find the next IDB in an update step 690 and then steps 610-680 are repeated until each of the identified individuals has a corresponding IDS. The IDSs are stored in the system memory 288.

The methods of the present invention for forming relationship webs are exemplified by, but not limited to the following example.

Figure 7A:
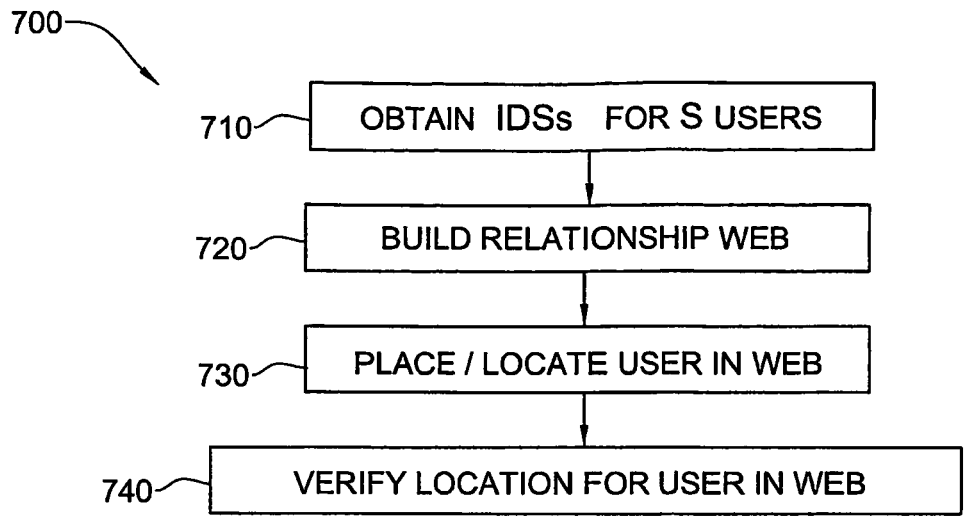
FIG. 7A is a simplified schematic flowchart illustrating an embodiment of step 130 of FIG. 1.

Reference is now made to FIG. 7A, which is a simplified schematic flowchart 700 for developing a relationship web, illustrating an embodiment of step 130 of FIG. 1.

In an IDS obtaining step 710, the IDSs of S users are obtained. This step may be similar to or different from flowchart 600 of FIG. 6. In some cases, the IDS of some users are stored in one database and others in another database. The databases may be merged, or combined into a third database in system 200.

The construction of an IDS should be understood in the virtual sense in the generation of an ensemble of data which serves as personal identifiers of an identified individual and his related individuals. In accordance with one embodiment, all components which constitute one IDS are stored as one data record. In accordance with other embodiments, a plurality of elements constituting a single IDS may be distributed between a plurality of data records.

In step 720 a relationship web, as described hereinabove, is created, for example on the basis of the obtained IDSs. This can include creating family trees, creating society hierarchical trees, creating work hierarchical trees, and the like. According to some embodiments of the invention, isolated relationship webs are created for each individual, showing all individuals having a certain predetermined number of relationship links to that individual. In accordance with other embodiments of the invention, the relationship web includes a plurality of individuals, e.g. all individuals residing in a geographical location, all individuals of a defined religion or sect, all individuals belonging to a certain culture, and occasionally all individuals in the database.

One exemplary use of the invention is in the automatic construction of a family tree. Unlike many systems that permit a user to produce his family tree, in accordance with the invention the generation process is in fact automatic. Although the user enters some of the relevant data, other data relevant for the construction of a family tree for a specific individual may be entered by others, as is explained with reference to FIG. 4. Another unique feature of the invention that is permits merging of different family tree databases to one another.

Figure 7B:
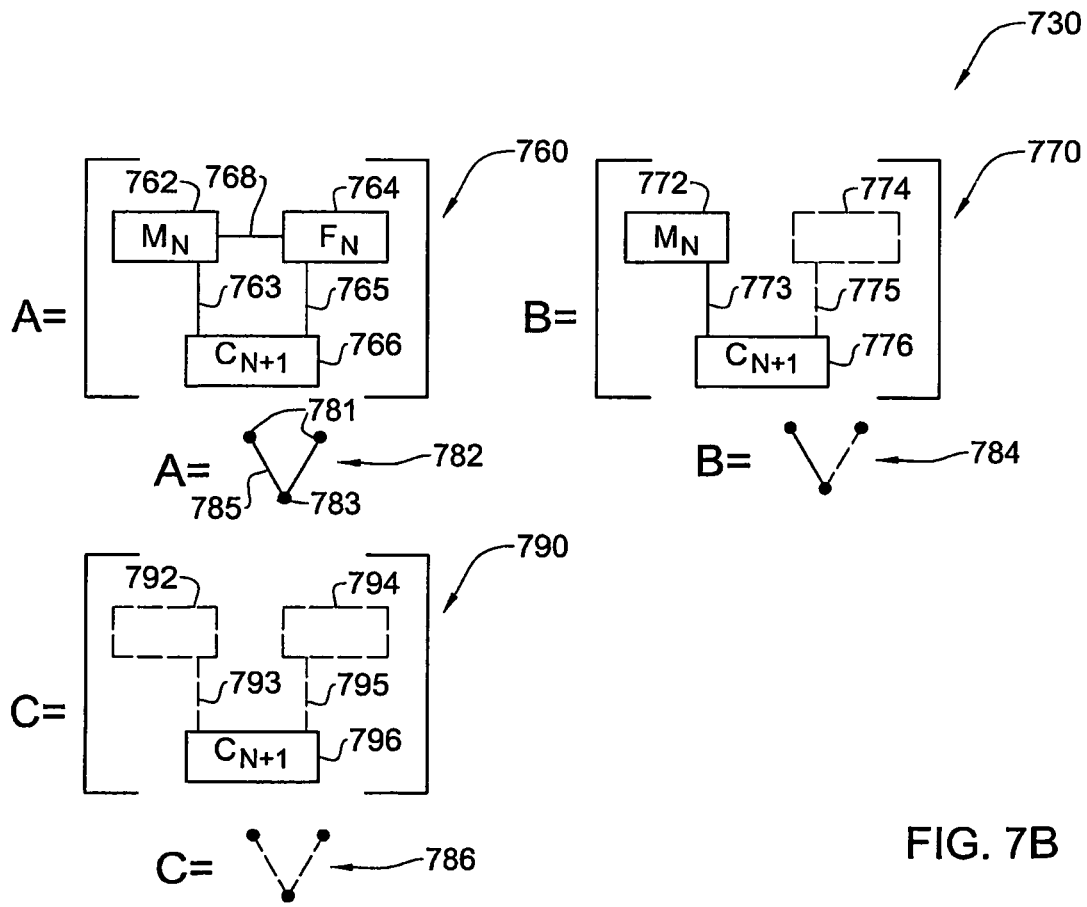
FIG. 7B is a simplified schematic illustration showing family structures and corresponding symbols, in accordance with an embodiment of the present invention.

FIG. 7B exemplifies family structures 760, 770, 790, in accordance with an embodiment of the present invention.

In accordance with some embodiments, each family or group of individuals can be provided with a family structure A, B or C. Family A represented by structure 760, has a mother 762, father 764 and child 766. The father and mother belong to generation N and the child to generation N+1. There may, of course, be a plurality of children (not shown). The mother and father are linked to the child with one line each 763 and 765. If married, the mother and father are linked with line 768.

In family B, represented by a one-parent family comprising structure 770, the father is (currently) unknown. The mother 772 is linked to child 776 by a solid line 773. The father 774 is linked to the child by a dotted line 775.

In some other cases, such as in family C, represented by structure 790, there are no known parents. Child 796 is linked to mother 792 and to father 794 by two dotted lines 793, 795 respectively.

The family structures of A, B and C may be denoted in "shorthand" as 782, 784 and 786 respectively, as is shown in FIG. 7B, where the child related node is denoted 783, and the parents related nodes—781 and 782 respectively.

These families may be real genetic families or families of people who have a certain social or work relationship.

Turning back to FIG. 7A, the building of the relationship web utilizes creation of the family tree. The family units are sorted and categorized. Thereafter, they are compared and super-imposed so as to form one or more relationship webs with a proper location of each individual therein (step 730). In some cases, steps 720 and 730 may be combined or their order reversed. For example, the construction of the relationship web may comprise a combination of placing individuals and families within a web.

In some embodiments, the relationship web is formed by combining a plurality of family structures, particularly family trees, included in two or more IDSs. As already noted above, each IDS includes, among others, personal identifiers and relationship data on related individuals. Thus, as also already pointed out above, each IDS constitutes a sort of a family database and may be used for construction of a family tree. By combining relationship data included in different IDSs one family tree may be enlarged and merged to others.

Data included in an IDS is already verified through some mode of verification, particularly such IDSs constructed from IDBs entered by a plurality of individuals. Thus, data included in an IDS will have some degree of verification whereby each related individual included in an IDS is already a verified individual and accordingly family trees merged in that manner are verified family trees.

As already pointed out above, while an IDS contains data on related individuals, at the same time there is also an IDS for each of the related individuals. Thus, upon merging of family trees through association of family databases from two or a plurality of IDSs, all IDSs associated with their related individuals in the IDSs which constitute the basis for merger may be updated, automatically, for example, by addition of related individuals to such IDSs as a result of new individuals who now become related through such merger of family trees.

Figure 8:
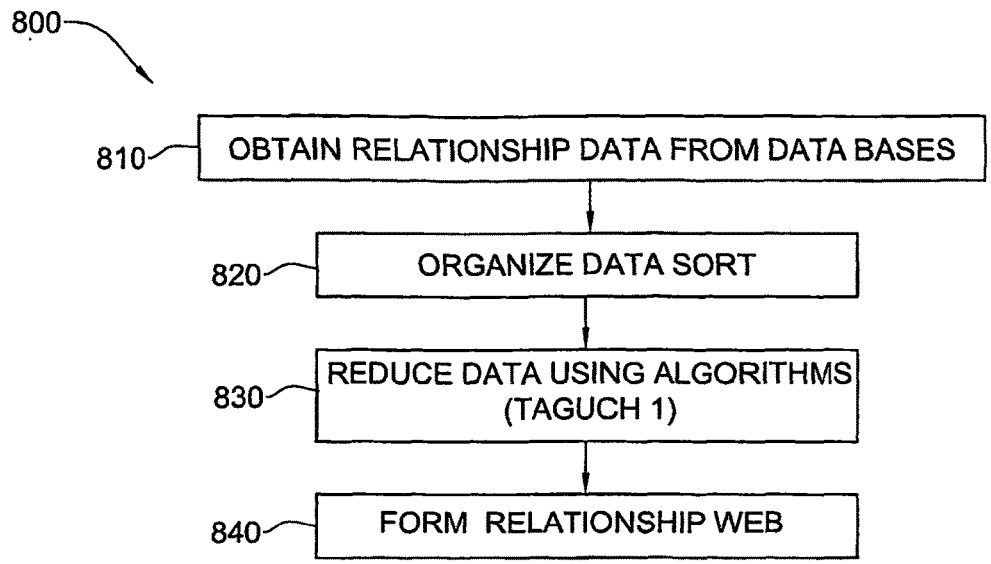
FIG. 8 is a simplified schematic flowchart illustrating an embodiment of step 720 of FIG. 7A.

Reference is now made to FIG. 8, which is a simplified schematic flowchart 800 exemplifying the formation of a relationship web (step 720 in FIG. 7A).

In an obtaining step 810, data regarding an individual is obtained. The so obtained data may be sorted according to a number of different parameters such as, but not limited to, type and relative position (step 820). For example, data may be sorted into the type of relationship web, family, friend, work etc. The data may be sorted according to relative position, for example, age, generation, geographical location and sub-location.

In a data reduction step 830, the quantity of data regarding the individual is sifted using at least one algorithm, such as by rationally designing the required data set, as is known in the art. In some embodiments, this step may precede step 820 (the data is sifted before sorting), in some other embodiments (as shown in the figure), sifting is applied to the sorted data.

The reduced data is then processed to form a relationship web (step 840). For example, a relationship web may be formed by combining a plurality of family structures (such as 782, 784, 786 of FIG. 7B). The relationship web may typically have a multidimensional topology.

The data obtained in the previous step may then be used to associate individuals, including, but not limited, individuals belonging to a single family, in a relationship structure one versus the other. In some cases, an individual may appear in several different family structures, such as family trees. Such an individual can then be used as a reference point to connect between the different structures and/or family trees.

The methods of the present invention for verifying relative positions on relationship webs include, but are not limited to standard vector matching methods. Using algorithms known in the art, the reference points between different structures/family trees can be ascertained with a very high degree of probability.

Figure 9:
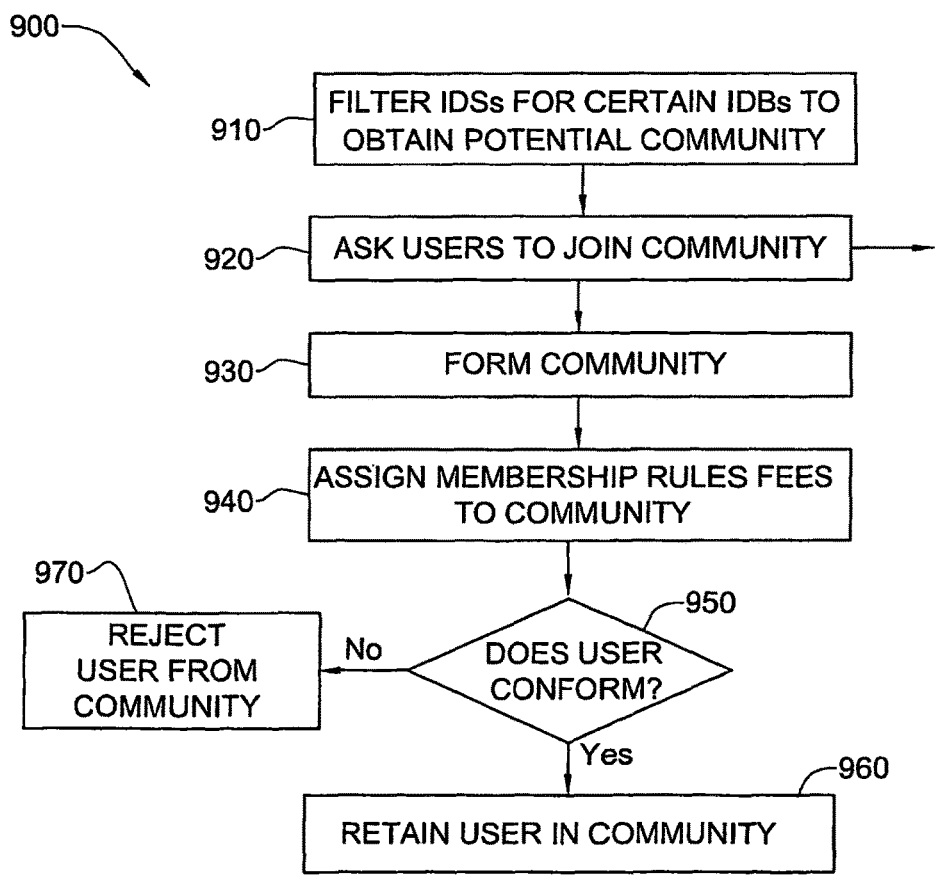
FIG. 9 is a simplified schematic flowchart illustrating an embodiment of step 140 of FIG. 1.

Reference is made to FIG. 9, which is a simplified schematic flowchart 900 exemplifying formation of a virtual community according to embodiment of FIG. 1.

In a first filtering step 910, the IDSs obtained in step 130 of FIG. 1 are filtered, for example, with regard to one or more indicators such as residence, scope of interest, hobby, demographic parameters, and others. For example, cyclists in the Regent's Park area in London, UK, can be selected in this manner from all other individuals.

In a subsequent asking step 920, all such selected individuals may be asked, by the system, if they wish to join a "Regent's Park Cycling Community". Of those asked, some may provide a positive reply by, for example, following a link which links them to a web page within the system website, that is formed for the "Regent's Park Cycling Community". A membership list of such formed virtual community may then be drawn and may be made available to all the identified individuals who chose to join this virtual community.

In an assigning rules and fees step 940, the joining individuals are asked to pay a standard annual fee and to agree to abide by a set of rules. For example, the rules may include: a) paying the fee by April of each year, b) not riding on the pavement (sidewalk) in London, c) not riding within 50 meters of the Regent's Park mosque unless fully covered, d) always using a front and rear lamp from sunset to 8 am; and e) applying a membership sticker to the front handlebars of the bicycle so as to be easily identified.

In a checking step, 950, the joining individuals if the abide by the rules. If, for example, the user does not pay the annual fee by April, he may be rejected from the community. Likewise, he may be rejected if he is found to break any of the rules b) to e). If he conforms to the rules, he is retained within the community until the April of the subsequent year.

The methods of the present invention, exemplified by FIGS. 1, 3, 5, 6, 7A, 7B, 8 and 9 enable the formation of a database in which the reliability of the IDSs are high and the probability of the verified data being incorrect is low. Furthermore, the superimposition of the family structures as shown in FIG. 7B provide a verification of identity tool superior in reliability to any other tool known in the art heretofore. The identity of an individual is verified by the methods of the present invention with a high degree of probability. Furthermore, the relationship between different family members is also verified unequivocally. Thus, the databases formed using the methods of the present invention may be used for many applications, as are exemplified herein.

The IDS containing databases of the invention contain verified data on individual and their relationships. Such databases may be used, in accordance with the invention, for a variety of uses where verification of user's identity is important. Such may include, for example, a variety of applications in internet e-commerce, for virtual networking with real and identified individuals, etc. Some applications that make use of the verified data included in the database of the invention will be exemplified further below. The fact that the IDSs containing database of the invention includes real and verified information on the individual's and individual demographics, may be used for a variety of uses for which computer network have not been used hitherto. Such may include, for example, demographic research, opinion polls, referenda and elections.

For example, demographic surveys and opinion polls can be carried out, on the basis of gender, age, ethnic type, religion, nationality, social status, and generally any breakdown of parameters of the identified individuals. All such surveys and opinion polls may have a relatively high accuracy as the data in the IDS, and hence the breakdown of the individual into groups of individuals with identified parameters, is with a relatively high reliability.

Use of the database for marketing purposes, such as for targeted marketing to individual with selected personal identifiers, is another possible application of the invention. Such targeted marketing may be to individuals selected through certain personal identifiers, may be to a group of individuals belonging to a virtual community formed in accordance with the invention, typically such which relates to the interest focus of such a virtual community. For example, a computerized chess game may be marketed to a virtual community of chess players.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Since the relative position of family members are reliably mapped according to the present invention, the nearest scheme may be located which may be important, for example, for purposes of adoption of individuals to related individuals, in order to allow to claim an inherited estate of an heirless deceased, etc.

The applications of the database of the present invention may be divided into some categories exemplified by:
 a) medical applications of family tree databases;
 b) commercial applications of family tree databases;
 c) Internet commercial applications of family tree databases;
 d) sectorial and targeted marketing;
 e) statistics and demographics or family tree databases;
 f) identifying lost persons; and
 g) family applications of family tree databases.

Some further embodiments of the present invention are directed to using the database for advertising campaigns. In some cases, the advertising campaign is selected from electronic media advertising, paper media advertising and banner advertising.

This invention is further directed to methods for using the database for a medical application. The medical application may be selected from a blood-related application, a non-genetic disease-related application, a genetic disease-related application, a drug application, a treatment application, an alternative medical treatment, and a personalized medical treatment.

Some embodiments of the present invention are directed to a method for using the database for a law-enforcement application. In some cases, the law-enforcement application is selected from, locating a criminal, locating a false identity, locating a relative of a deceased person, and locating an internet illegal transaction.

Additional embodiments of this invention are directed to methods for using the database for a family application. Sometimes, the family application may be the creation of a family portal, a family calendar, a family trip, a family forum, a family chat, and a family image databank.

Additional embodiments of this invention are directed to methods for using the database for a community application. In some cases the community application may be the creation of a community portal, a community calendar, a community trip, a community forum, a community chat, and a community image databank.

Although the invention has been described in conjunction with specific embodiments thereof, it is evident that many alternatives, modifications and variations will be apparent to those skilled in the art.

The invention claimed is:

1. A method for verifying the identity data provided by an individual requesting to connect with other individuals over a computer network through network connected computers, the method being carried out by a computer system, the computer system comprising a processor and a non-transitory computer readable memory and being connected to the computer network, the method comprising the steps of:

receiving and storing, by the processor, first individual-associated data bits (IDBs) into the non-transitory computer readable memory of the computer system, the first IDBs comprising a group of data pieces that relate to a first individual, said group of data pieces comprising at least one personal identifier datum relating to (1) the identity of the first individual, (2) relationship data comprising data concerning a family relationship between the first individual and one or more related individuals related to the first individual, and (3) the nature of the familial relationship between the first individual and the one or more related individuals, said at least one personal identifier datum thereby enabling to identify the first individual and the one or more related individuals with a certain degree of probability of distinguishing a specific individual from others;

independently receiving and storing, by the processor, data records comprising one or more additional IDBs into the non-transitory computer readable memory of the computer system, each of the additional IDBs comprising a group of data pieces that relate to an additional individual, the group of data pieces for each additional individual comprising at least one personal identifier datum relating to (1) the identity of the additional individual, (2) relationship data comprising data concerning a family relationship between the additional individual and one or more related individuals related to the additional individual, and (3) the nature of the familial relationship between the additional individual and the one or more related individuals, said at least one personal identifier datum of the additional IDBs thereby enabling to identify the additional individuals and the one or more related individuals in the additional IDBs with a certain degree of probability of distinguishing a specific individual from others;

in response to said receiving of the first IDBs of the first individual, automatically processing, by the processor, the first and additional IDBs to verify identity of the first individual, said processing comprising executing computer-readable instructions stored in the non-transitory computer readable memory, the instructions causing the processor to perform the steps of:

(a) comparing data about the one or more related individuals in the first IDBs and the data records comprising the additional IDBs, for identifying matching data indicating that a related individual in the first IDBs is the same individual as an additional individual or a related individual in the additional IDBs, (b) upon identifying the matching data, verifying at least part of the data pieces in the first IDBs by comparing said at least part of the data pieces of the first IDBs with corresponding data pieces in one or more IDBs of other individuals having said matching data and determining a degree of correspondence between them, (c) determining a reliability score of the first IDBs based on the degree of correspondence of the verified data pieces in the first IDBs with the corresponding data pieces in the IDBs of other individuals having the matching data, the data pieces comprising multiple different parameters that identify the first individual, and the determination of the reliability score including scoring the degree of correspondence of the multiple different parameters, and (d) analyzing the reliability score with respect to a predetermined threshold value and generating and storing, in the non-transitory computer readable memory, a virtual identification document (VID) for the first individual as a user of said computer network, the VID comprising an individual-identifier data set (IDS) for the first individual and the reliability score, and upon determining that the reliability score is equal to or exceeds said predetermined threshold, including in said VID an indication identifying the first individual as having verified identity data and permitting a communication over the computer network that is sent to or from the first individual.

2. The method according to claim 1, wherein said step of determining the reliability score for the first individual comprises executing computer-readable instructions by the processor to perform the steps of scoring one or more of the data pieces in the IDBs of the first individual based on correspondence with data pieces in IDBs of an additional individual to obtain a reliability score for one or more of the IDBs or the IDS of the first individual.

3. The method according to claim 1, carried out on a sufficiently programmed computerized system that comprises a server utility of the computer network and configured to allow a plurality of individuals to connect thereto via computerized devices.

4. The method of claim 1, further comprising causing the processor to perform steps for repeating said processing steps one or more times, each time substituting one of the additional individuals, or one of the identified related individuals, for the first individual used in the first iteration, to thereby generate an IDS for the new first individual with an associated reliability score.

5. The method according to claim 4, comprising executing computer-readable instructions by the processor to perform the steps of:
identifying at least two IDSs having overlapping relationship data including at least one identical identified individual in the corresponding relationship data to obtain at least two relationship data pieces; and
consolidating the at least two relationship data pieces to construct an expanded relationship data record.

6. The method according to claim 5, further comprising executing computer-readable instructions by the processor to perform the steps of:
constructing an expanded family database comprising all family databases with overlapping relationship data, and data indicative of the connection between individuals of the expanded family database.

7. The method of claim 4, wherein said processing steps and said repeated processing steps occur simultaneously.

8. The method of claim 7, further including causing the processor to perform steps for constructing a verified database comprising: (i) the IDSs and the respective reliability score for each individual processed in said processing steps, or (ii) the IDSs of only those individuals processed in said processing steps whose IDS has a reliability score equal to or greater than a pre-determined value.

9. A computer system comprising a processor and a non-transitory computer-readable storage unit that stores a database that was generated by the process in accordance with claim 8.

10. The method of claim 8, further including the step of causing the processor to perform steps for providing access to the verified database.

11. The method of claim 8, wherein said verified database comprises the IDSs and the respective reliability score for each individual processed in said processing steps.

12. The method of claim 8, wherein said verified database comprises the IDSs of only those individuals processed in said processing steps whose IDS has a reliability score equal to or greater than a pre-determined value.

13. The method according to claim 4, wherein the IDS for each identified individual comprises data on the one or more related individuals, and personal identifiers and relationship data of family members of the identified individual and one or more related individuals.

14. The method according to claim 4, further comprising executing, by the processor, computer-readable instructions that cause the processor to perform the steps of updating one or more existing IDSs upon entry of IDBs by another individual.

15. The method according to claim 14, further comprising executing computer-readable instructions by the processor to perform the steps of updating an IDS associated with one individual by new data relating to that individual, new data on one or more related individuals included in the IDS, or by adding one or more personal identifiers and relationship data on related individuals to the IDS.

16. The method according to claim 15, further comprising executing computer-readable instructions by the processor to perform the steps of automatically transmitting an electronic notification advising on the update to a computerized device or electronic address associated with the individual whose IDS has been updated.

17. A method of constructing a verified computer database storing information about a plurality of individuals via a network connected computer system and verifying identity of one of the plurality of individuals requesting to communicate with other individuals over the network connected computer system, the method being performed by a computer system, the computer system comprising a processor and a non-transitory computer readable memory and being connected to the internet, the method comprising causing the processor to execute instructions to perform the steps of:
independently receiving and storing by the processor, individual-associated data bits (IDBs) from the plurality of individuals into the system non-transitory computer readable memory;
processing, by the computer system processor, the IDBs entered by the plurality of individuals, said processing comprising executing computer-readable instructions stored in the non-transitory computer readable memory, causing the processor to execute instructions to perform the steps of:
comparing the IDBs entered by the plurality of individuals to identify matching data, indicating that one or more individuals indicated in a first individual IDBs as being family related to the first individual and one or more individuals indicated in at least one second individual IDBs as being the second individual or family related to the second individual, are the same identified individuals;
upon identifying a first individual IDBs and one or more IDBs of one or more second individuals having the matching data, verifying at least part of the IDBs of the first individual through the matching data identified with said one or more IDBs of said one or more second individuals with respect to the same identified individual;
determining a reliability score for each IDBs of each identified individual on the basis of the degree of correspondence between data relating to the identified individual in the IDBs entered by the first individual and the matching data relating to the identified individual in the IDBs of the one or more second individuals, the data relating to the identified individual comprising multiple different parameters that identify the identified individual, and the calculation of the reliability score including scoring the degree of correspondence of the multiple different parameters;
analyzing the reliability score with respect to a predetermined threshold value; and
constructing and storing in the non-transitory computer readable memory, a database comprising: (i) a virtual identification document (VID) for each identified individual as a user of said computer network, the VID comprising an individual-identifier data set (IDS) and the respective reliability score for each identified individual, or (ii) a virtual identification document (VID) comprising an individual-identifier data set (IDS) only for the identified individual whose IDBs has the reliability score equal to or greater than said threshold;
upon determining that the reliability score is equal to or exceeds the predetermined threshold, including in the VID an indication identifying one of the identified individuals as having verified identity data and permitting a communication over the computer network that is sent to or from the identified individual.

18. The method of claim 17, comprising causing the processor to perform steps for providing access to the database.

19. A computerized method, implemented on a computer system connected to and part of a computer network, the computerized method comprising the steps of:
receiving and storing, by a processor in the computer system, individual-associated data bits (IDBs) from a first user into a non-transitory computer-readable memory in the computer system, the IDBs of the first user comprising at least one personal identifier datum relating to the identity of a first specific individual, relationship data concerning a direct family relationship between the first specific individual and one or more related individuals and the nature of the direct family relationship between them, said at least one personal identifier datum of the first user thereby providing information for identifying one or more individuals in the first user IDBs to a certain degree of probability of distinguishing a specific individual from others;
receiving and storing, by the processor, into the non-transitory computer-readable memory IDBs from at least one second user, independently of the first user, the IDBs of the at least one second user comprising at least one personal identifier datum relating to the identity of the at least one second specific individual and relationship data concerning a direct family relationship between the at least one second specific individual and one or more related individuals and the nature of the direct family relationship between them, said at least one personal identifier datum of the second user thereby providing information for identifying one or more individuals in the second user IDBs to a certain degree of probability of distinguishing a specific individual from others;
in response to said receiving of the IDBs from the first user, processing by said processor, of the IDBs received from the first user and at least one second user for identifying identity of the first user, said processing comprising executing computer-readable instructions stored in the non-transitory computer readable memory, the instructions causing the processor to perform steps for:
comparing the IDBs of the first user and at least one second user to identify matching data based on an indication that one or more individuals in the first user IDBs and one or more individuals in the at least one second user IDBs are the same individual;
upon identifying first and second users' IDBs having the matching data about the same individual, calculating a distance between the first user and the at least one second user IDBs based on one or more predetermined set of rules comprising a standard length assigned to the type of the direct family relationship between the first user and the at least one second user;

utilizing said calculated distance and calculating a reliability score for each IDBs as a function of the distance between the first user IDBs and the at least one second user IDBs;

analyzing the reliability score with respect to a predetermined threshold value to determine whether said reliability score is equal to or above said predetermined threshold value, and constructing and storing in the non-transitory computer readable memory, a database comprising one of the following: (i) a virtual identification document (VID) for each identified individual as a user of said computer network, the VID comprising an individual-identifier data set (IDS) together with the respective reliability score, or (ii) a virtual identification document (VID) comprising an individual-identifier data set (IDS) where the reliability score is equal to or greater than the pre-determined threshold value;

providing user access to said database to verify, using the processor, the identity of a user requesting to connect with a computer connected to the network based on the stored reliability score with respect to the predetermined threshold value; and upon determining that the reliability score is equal to or exceeds the predetermined threshold, including in the VID an indication identifying the user requesting to connect with the computer as having verified identity data and permitting a communication over the computer network that is sent to or from the user.

20. A computerized method, implemented on a computer system connected to and part of an Internet connected computer network, the computerized method comprising the steps of:

independently receiving and storing, by a processor in the computer system, individual-associated data bits (IDBs) from a plurality of users into a non-transitory computer-readable memory in the computer system, the IDBs comprising at least one personal identifier datum relating to the identity of a particular user, relationship data concerning a direct family relationship between the particular user and one or more related individuals, and the nature of the direct family relationship between the particular user and the one or more related individuals, said at least one personal identifier datum in the user's IDBs thereby providing information for identifying the one or more individuals to a certain degree of probability of distinguishing a specific individual from others;

processing by said processor, the IDBs received from the particular user and at least one additional user, said processing comprising executing computer-readable instructions stored in the non-transitory computer readable memory, the instructions causing the processor to perform steps for:

upon said receiving of the IDBs of a particular user, comparing the IDBs of the particular user and at least one additional user to identify matching data based on an indication that one or more individuals in the particular user IDBs and one or more individuals in the at least one additional user IDBs are the same individual;

upon identifying the particular user IDBs and at least one other user IDBs containing the matching data about the same individual, calculating a distance between the particular user IDBs and the at least one other user IDBs based on one or more variables or weighing factors defining distance of the direct family relationship;

utilizing said distance and calculating a reliability score for each of said IDBs of the first user and at least one other user, as a function of the distance between the first user IDBs and the at least one second user IDB s; and constructing and storing in the non-transitory computer-readable memory, a database comprising one of the following: (i) a virtual identification document (VID) for each identified individual as a user of said computer network comprising an individual-identifier data set (IDS) together with the respective reliability score for each identified individual, or (ii) a virtual identification document (VID) comprising an individual-identifier data set (IDS) for each identified individual where the reliability score is equal to or greater than the pre-determined value;

providing access to the database to verify, using the processor, the identity of one of the plurality of users requesting to connect with a computer connected to the network when the stored reliability score is equal to or above the predetermined threshold value; and upon determining that the reliability score is equal to or exceeds the predetermined threshold, including in the VID an indication identifying the user requesting to connect with the computer as having verified identity data and permitting a communication over the computer network that is sent to or from the user.

* * * * *